(12) United States Patent
Liu et al.

(10) Patent No.: US 8,131,539 B2
(45) Date of Patent: Mar. 6, 2012

(54) SEARCH-BASED WORD SEGMENTATION METHOD AND DEVICE FOR LANGUAGE WITHOUT WORD BOUNDARY TAG

(75) Inventors: Wen Liu, Beijing (CN); Yong Qin, Beijing (CN); Xin Jing Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1034 days.

(21) Appl. No.: 12/044,258

(22) Filed: Mar. 7, 2008

(65) Prior Publication Data

US 2008/0221863 A1     Sep. 11, 2008

(30) Foreign Application Priority Data

Mar. 7, 2007    (CN) .......................... 2007 1 0086030

(51) Int. Cl.
 G06F 17/27       (2006.01)
 G06F 17/20       (2006.01)
(52) U.S. Cl. ................................. 704/9; 704/1
(58) Field of Classification Search ................ 704/9
 See application file for complete search history.

(56) References Cited

U.S. PATENT DOCUMENTS

| | | | | |
|---|---|---|---|---|
| 5,583,763 | A * | 12/1996 | Atcheson et al. | ............. 707/750 |
| 6,381,598 | B1 | 4/2002 | Williamowski | |
| 7,680,648 | B2 * | 3/2010 | Elbaz et al. | ........................ 704/9 |
| 2004/0073541 | A1 * | 4/2004 | Lindblad et al. | .................. 707/3 |
| 2005/0222998 | A1 * | 10/2005 | Driessen et al. | .................. 707/4 |

FOREIGN PATENT DOCUMENTS

TW           575813        *    2/2004

OTHER PUBLICATIONS

Sassano, "An Empirical Study of Active Learning with Support Vector Machines for Japanese Word Segmentation", Proc. of the 40th Annual Meeting of the Association for Computational Linguistics, Jul. 2002.*
Ying Zhang et al., "Using the Web for Translation Disambiguation", Proceedings of NTCIR-5, Dec. 2005.*
Tim Ng, et al, "Web-data Augmented Language Models for Mandarin Conversational Speech Recognition", ICASSP, Mar. 2005, Philadelphia, PA.
Ying Zhang, et al, "Using the Web for Translation Disambiguation", Proceedings of NTCIR-5, Dec. 6, 2005, Tokyo, Japan.

* cited by examiner

*Primary Examiner* — Samuel G Neway
(74) *Attorney, Agent, or Firm* — William Stock; Anne Vachon Dougherty

(57) ABSTRACT

The present invention discloses a search-based segmentation method and device for a language without a word boundary tag. The inventive method includes the steps of: a. providing at least one search engine with a segment of a text including at least one segment; b. searching for the segment through the at least one search engine, and returning search results; and c. selecting a word segmentation approach for the segment in accordance with at least part of the returned search results. The invention solves the problems of word segmentation for a language without a word boundary tag, and thus combat the limitations of the prior art in terms of flexibility, dependence upon coverage of dictionaries, available training data corpuses, processing of a new word, etc.

19 Claims, 6 Drawing Sheets

巴金-->寒夜-->一八
我给你带来好消息,独山克服了,"树生望着他高兴地大声说。" 这是晚报。" 她把手里捏的一
张晚报递给他。..."那么我们两个中间走开一个就成罗,哪个高兴哪个就走.这不很公平
吗?"树生半生气半开玩笑地说。...
www.bac.edu.cn/tdeparts/shengw... - 20K - 2004/12/08 - 网页快照 - 更多此站结果

寒夜--中华小说网
我给你带来好消息,独山克服了,"树生望着他高兴地大声说。" 这是晚报。" 她把手里捏的一
张晚报递给他。..."那么我们两个中间走开一个就成罗,哪个高兴哪个就走.这不很公平吗?"
树生半生气半开玩笑地说。...
www.cn-novel.com/xiandai/bajin... - 40K - 2006/07/17 - 网页快照 - 更多此站结果

渝网 -小说频道-银鸡泪
我高兴的时候就让他们摸。" 她稍一侧身,从他身边走开。" 我的糖,祥伯。" 她边说边伸出
手。...丽佳呆呆地看着他,纳闷自己说了什么错话,惹他这么不高兴。 过了一会,她才答
道:"是没有关系。...她不高兴地问:"你对他说了些什么?"阿昌嘿嘿地笑了,"我对他说, 妈呀,
你看看这小妞儿。...
www.yu163.com/book/showbooktex... - 99K - 2006/05/25 - 网页快照 - 更多此站结果

Fig.4

SEARCH-BASED WORD SEGMENTATION METHOD AND DEVICE FOR LANGUAGE WITHOUT WORD BOUNDARY TAG

FIELD OF THE INVENTION

The present invention relates to the field of word segmentation technologies for a language without a word boundary tag, and in particular to a search-based word segmentation method and device for a language without a word boundary tag.

BACKGROUND OF THE INVENTION

Numerous Asian languages, such as Chinese, Japanese, Korean, Thai, and the like, do not delimit words by word boundary tag, such as white space, which is unlike English and other western languages. A sentence will typically comprise a set of consecutive characters, and there is no delimiter, i.e., separator, between words. How to delimit words is dependent upon whether a word in question is a phoneme word, a vocabulary word, a morphology word, a sentence making-based word, a semantics word or a psychology word. Consequently, for any word-based language process, for example, Text-to-Speech (i.e. speech synthesis, or TTS), extracting a document feature, automatic document abstraction, automatic document sorting, and Chinese text searching, the first step is to segment each sentence into words.

For the purpose of clarity, the present invention will be described with respect to Chinese, for instance, but will not be limited to this as shall be appreciated.

Word segmentation approaches for Chinese words primarily need to solve two issues in Chinese Natural Language Processing (NLP), that is, what a word is in Chinese, and how a computer identifies automatically a Chinese word. Correspondingly, Chinese word segmentation involves mainly two research issues: word boundary disambiguation and unknown word identification. Unfortunately, in most of current systems, these two issues are considered to be two separate tasks, and hence are dealt with using different components in a cascaded or consecutive manner. However, some specific language natures of Chinese words result in that a major difficulty in Chinese word segmentation presents an output which can vary dependent upon different linguistic definitions of words and different engineering requirements. In this regard, there is no single standard that can satisfy all linguists and all computer applications, and no standard allowing a definite determination of a word in each context that can be accepted universally. Using SIGHAN 2005 Competition (SIGHAN Workshop 2005. www.sighan.org/bakeoff2005/) as an example, although all the groups involved reported accuracy above 90 percent, a training corpus contains about 90,000 sentences, while a testing dataset has only about 4,400 sentences. Moreover, these results have to be compared separately under four segmentation standards (namely MSR, PKU, CityU and MSRA). This brings a problem to the development in corpuses that can be used in training of different types of NLP systems, and also poses a challenge to the Chinese word segmentation system that can support multi-user application.

Current approaches to Chinese word segmentation fall roughly into four categories: 1) dictionary-based methods, 2) statistical machine learning methods, 3) transformation-based methods, and 4) combining methods.

In dictionary-based methods, a predefined dictionary is used along with artificial grammar rules. In such dictionary-based methods, sentences are segmented in accordance with the dictionaries, and the grammar rules are used to improve the performance. A typical technique of dictionary-based method is called maximum matching, in which an input sentence is compared with entries in a dictionary to find out an entry which includes the greatest number of matching characters. Intuitively, the accuracy of this type of methods is seriously affected by the limited coverage of the dictionary and the lack of robust statistical inference in the rules. Since it is virtually impossible to list all the words in a predefined dictionary and impossible to timely update the dictionary, the accuracy of such methods degrades sharply as new words appear.

Statistical machine learning methods are word segmentation methods for text using probabilities or a cost-based scoring mechanism instead of dictionaries. Current statistical machine learning methods fall roughly into the following categories: 1) the MSRSeg method, involving two parts, where one part is a generic segmenter, which is based upon the framework of linear mixture models, and unifies five features of word-level Chinese language processing, including lexicon word processing, morphological analysis, factoid detection, named entity recognition, and new word identification; and the other part is a set of output adaptors for adapting an output of the generic segmenter to different application-specific standards; 2) information of adjacent characters is utilized to join the N-grams and their adjacent characters; 3) a maximum likelihood approach; 4) approach employing neural networks; 5) a unified HHMM (Hierarchical Hidden Markov Model)-based frame of which a Chinese lexical analyzer is introduced; 6) Various available features in a sentence are extracted to construct a generalized model, and then various probabilistic models are derived based upon this model; and 7) mutual information and t-score difference between characters is used, which is derived automatically from raw Chinese corpora, and conditional random fields are used for the segmentation task. Consequently, this type of approach generally requires large annotated Chinese corpora for model training, and more importantly, lacks the flexibility to be adapted to different segmentation standards.

Transformation-based methods are initially used in POS (Part-of-Speech) tagging and parsing. The main idea of these methods is to try to learn a set of n-gram rules from a training corpus and to apply them to segmentation of a new text. The learning algorithm compares the corpus (serving as a dictionary) with its un-segmented counterpart to find the rules. One transformation-based method trains taggers based on manually annotated data so as to automatically assign Chinese characters with tags that indicate the position of a character within a word. The tagged output is then converted into segmented text for evaluation. Another transformation-based method presented is Chinese word segmentation algorithms based upon the so-called LMR tagging. The LMR taggers in such a method are implemented with the Maximum Entropy Markov Model, and transformation-based learning is adopted to combine results of two LMR taggers that scan an input in opposite directions. A further transformation-based method presents a statistical framework, and identifies domain-specific or strongly time-dependent words based upon linear models, and then performs adaptation to standards by a post-processor performing a series of conversions on an output from the generic segmenter to implement a single word-segmentation system. The transformation-based methods learn N-gram rules from training corpora, and therefore are still limited to training corpora.

Combining Methods are methods which combine several current methods or various information. For instance, dictionary and word frequency information can be combined; a maximum entropy model and a transformation-based model can be combined; several Support Vector Machines can be trained, and how a dynamic weighted method works for the segmentation task can be explored; a Hidden Markov Model-based word segmenter and Support Vector Machine-based chunker can be combined for this task. As disclosed in Unsupervised Training for Overlapping Ambiguity Resolution in Chinese Word Segmentation" (Li, M., Gao, J. F., Huang, C. N., and Li, J. F., Proceedings of the Second SIGHAN Workshop on Chinese Language Processing. Jul. 2003, pp. 1-7), an unsupervised training approach is proposed to resolve overlapping ambiguities in Chinese word segmentation, which trains a set of Naïve Bayesian classifiers from an unlabelled Chinese text corpus. Among the combining methods, a system can be conveniently customized to meet various user-defined standards in the segmentation of MDWs (Morphologically Derived Words). In this system, all MDWs contain word trees where root nodes correspond to maximal words and leaf nodes correspond to minimal words. Each non-terminal node in the tree is associated with a resolution parameter, which determines whether its children are to be displayed as a single word or separate words. Different outputs of segmentation can be obtained from different cuts of the word tree, which cuts are specified by the user through the different value combinations of those resolution parameters. Obviously, the combining methods merely combine the several types of methods as described previously, and therefore, may still be limited alike.

As can be seen from the descriptions above, although many different approaches have been proposed in the art, they are mainly methods based upon either dictionaries or statistics, and thus confront many problems in theory linguistics and computer linguistics. That is, they have a poor flexibility, depend greatly upon coverage of the dictionaries or are limited by an available large corpus of training data, have a weak ability in identifying an Out-of-Vocabulary (OOV) words and the identified OOV word may be discredited in linguistics, etc. Thus, the Chinese word segmentation performance is still unsatisfactory. Moreover, manual labeling of a training corpus is a time-consuming and tedious task, which is the reason that few training corpuses are available.

SUMMARY OF THE INVENTION

An object of the present invention is provide a search-based word segmentation method and device for a language without a word boundary tag, which can solve relatively well the problem of word segmentation for a language without a word boundary tag and thus overcome the disadvantages in the prior art. The invention uses search results returned from a search engine to segment words, and thus combat the limitations of the current word segmentation approaches in terms of flexibility, dependence upon coverage of dictionaries, available training data corpuses, processing of a new word, etc.

According to an aspect of the invention, there is provided a search-based word segmentation method for a language without a word boundary tag, including the steps of: a. providing at least one search engine with a segment of a text including at least one segment; b. searching for the segment through the at least one search engine, and returning search results; and c. selecting a word segmentation approach for the segment in accordance with at least part of the returned search results.

According to another aspect of the invention, there is provided a search-based word segmentation device for a language without a word boundary tag, including: at least one search engine, adapted to receive a segment of a text including at least one segment, to search in a search network for the segment, and to return search results; and a word segmentation result generating means, adapted to select a word segmentation approach for the segment in accordance with at least part of the returned search results.

As can be seen from the above aspects, the invention may be advantageous in the following.

Unlike previous dictionary-based method or statistical learning method, the invention uses a search technology for word segmentation of a language without a word boundary, such as Chinese. In this way, the invention needs neither a predefined dictionary nor a large training corpus.

One advantage of the invention lies in detection of a new word. The invention provides a very easy way to identify an OOV word, e.g. "非典"(SARS), while new words emerge everyday, since information available in the Internet is dynamic and updated rapidly.

Since the previous methods require a support from dictionaries, the dictionaries are limited regardless of whether they are used for a real-time query (e.g. a dictionary-based method) or for training a word segmentation model (e.g. a statistical method, etc.). In contrast, the "dictionary" in the invention is Internet-based, and thus dynamic and updatable in a real-time way. Therefore, identification of a new word is very simple and effective, so that the OOV problem can be avoided, which is inevitable in the previous methods.

As analyzed by Wu, A. in Customizable Segmentation of Morphologically Derived Words in Chinese. Computational Linguistics and Chinese Language Processing. Vol. 8, No. 1, Feb. 2003, pp. 1-28, for instance, different applications expect different word segmentation units, and even native speakers of Chinese would disagree on whether a given character string is a word. As reported by Sproat, R., C. Shih, W. Gale and N. Chang, in "A stochastic finite-state word-segmentation algorithm for Chinese", Computational Linguistics, 22(3), 1996, pp. 377-404, the rate of an agreement among human judgments was only 76%. Hence, if alternative word segmentation units can be provided, a segmentation system may be much more effective.

According to the invention, various word segmentation units can be provided through a search engine. For instance, a query "试了一试"("had a try") returns '试了" ("tried"), -试 ("a try"), "试了一试"("had a try") by the Yahoo! Search. This feature, plus the word segmentation unit scoring step in the invention, enables the adaptability of the inventive method and device to various standards.

As mentioned above, the manual labeling of a training corpus is a time-consuming and tedious task, while the inventive method and device may be entirely unsupervised. Since in the invention, the only step which may require a training course relates to the scoring function. According to the invention, if a "term frequency" is used as a scoring criterion for word segmentation units, then no data needs to be trained, thus making the entire solution unsupervised.

Since the invention uses numerous documents retrieved though a search engine from the Internet to obtain initial word segmentation units, and the documents are human-written, hence in compliance with a natural language, the inventive method and device can obtain directly a correct word segmentation result without a natural language analysis of the documents, in comparison with the previous methods.

BRIEF DESCRIPTION ON THE DRAWINGS

As the present invention is better understood, other objects and effects thereof will become more apparent and easy to understand from the following description, taken in conjunction with the accompanying drawings wherein:

FIG. 4 depicts search results of the search using the public Yahoo! search engine;

DESCRIPTION OF THE PREFERRED EMBODIMENTS

Preferred embodiments of the invention will be described in details hereinafter.

Figure 1:
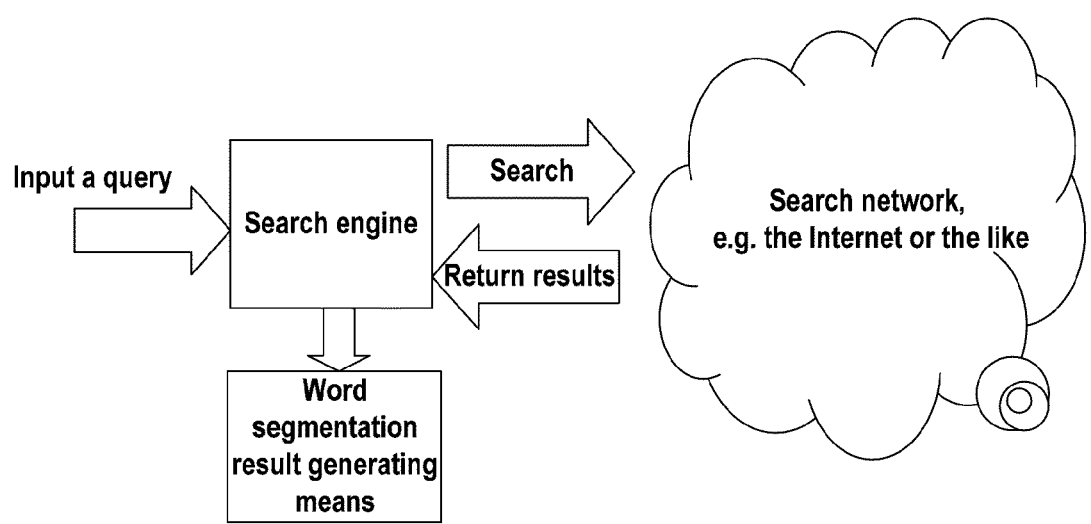
FIG. 1 is a schematic diagram of elementary elements in a search-based word segmentation system for a language without a word boundary tag according to an embodiment of the invention.
Figure 2:
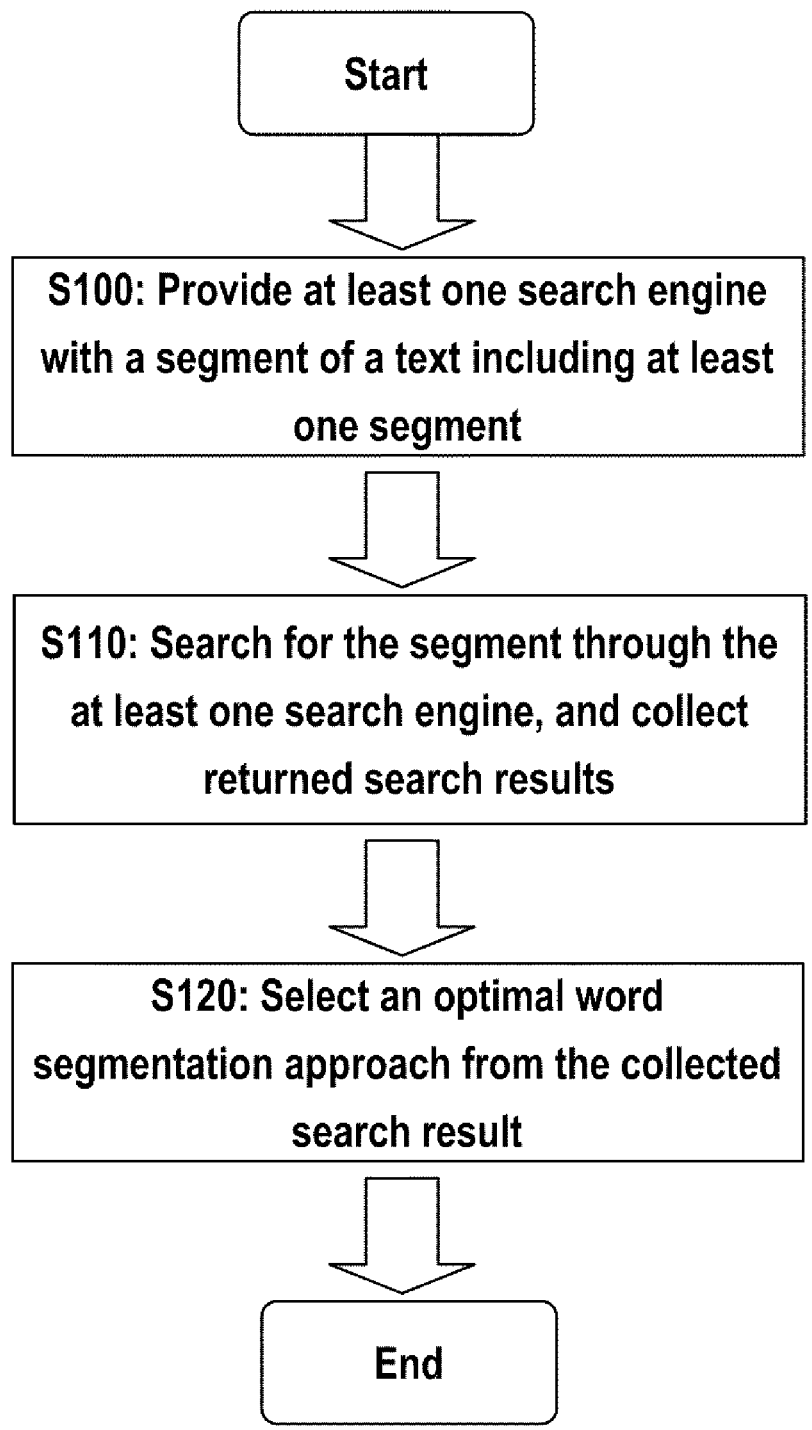
FIG. 2 depicts a search-based word segmentation method for a language without a word boundary tag according to an embodiment of the invention.

FIG. 1 is a schematic diagram of elementary elements in a search-based word segmentation system for a language without a word boundary tag according to an embodiment of the invention, and FIG. 2 depicts a search-based word segmentation method for a language without a word boundary tag according to an embodiment of the invention. According to an embodiment of the invention, during word segmentation for a text of a language without a word boundary tag, such as a text of Japanese, Korean, Thai or Chinese, or even a space-free text of English or another western language, firstly in step S100, a segment of the text including at least one segment is provided as a query content to at least one search engine 1. The query content can be provided to the engine, for instance, through a keyboard input, a manual input, a voice input, a direction operation on the text (e.g. a segment of text is selected for the operation), or any other available way. The segments of the text can be separated by interpunctions or other marking contents or symbols. In step S110, searches for the query content (segment) through the search engine 1 are made in a search network 2, such as the Internet, and the search results are returned. In the step S120, a word segmentation generating means 3 selects an optimal word segmentation approach for the submitted segment in accordance with the returned search results.

For instance, firstly a sentence is segmented by punctuation into a group of sentence units. Then each sentence unit is submitted as a query to a search engine. All candidate phrases (i.e. the hits), called candidate word segmentation units, are extracted from snippets of the documents, which are returned from the search engine. A score can be calculated for each candidate word segmentation unit. All the candidate word segmentation units form a plurality of subsets. The candidate word segmentation units in each subset are cascaded to form the submitted query, that is, a "path" (i.e. sequence), and an optimal "path" is taken as a word segmentation result of the submitted sentence units.

Figure 3:
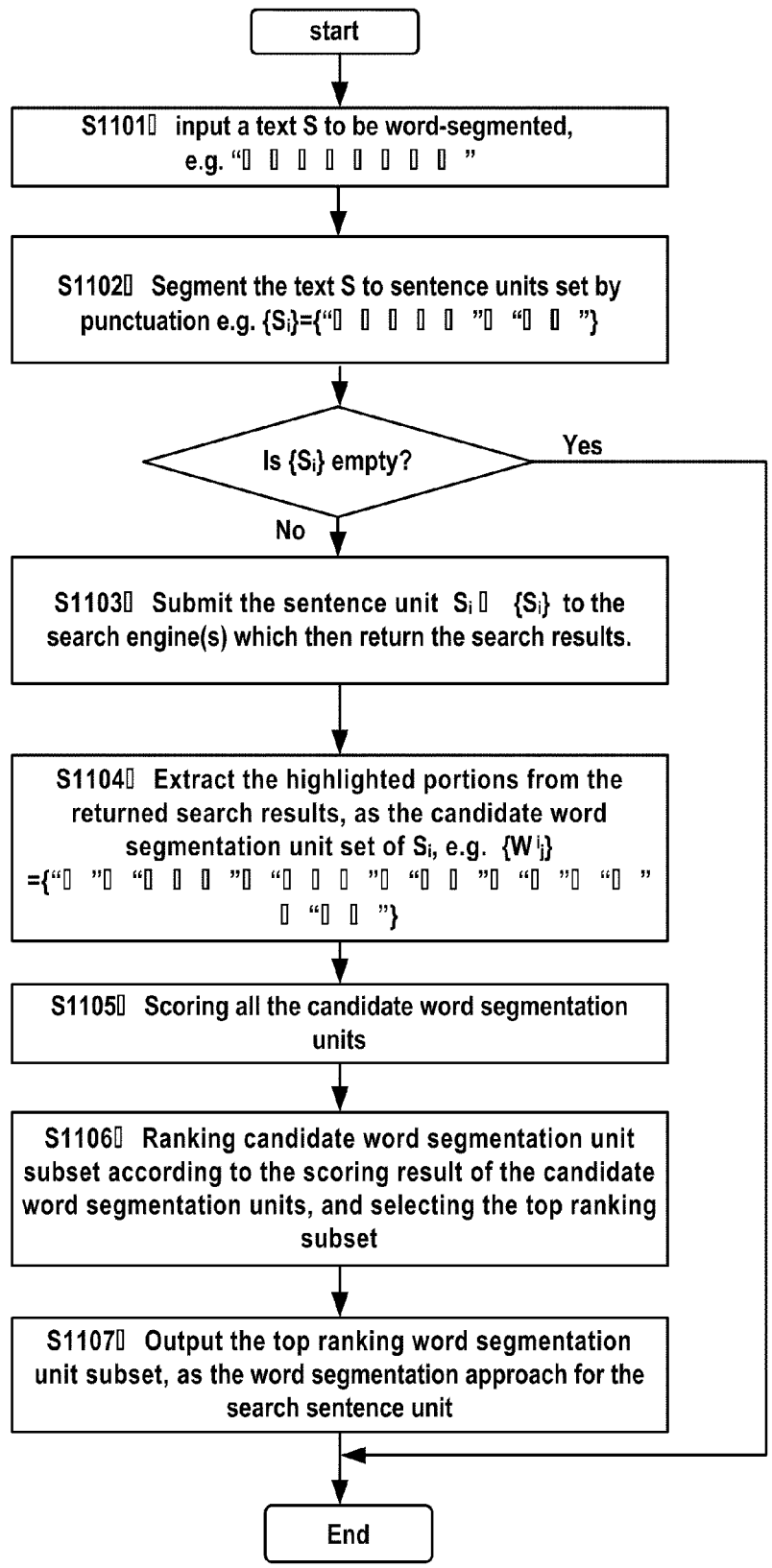
FIG. 3 depicts a flow chart of an example of the search-based word segmentation method according to an embodiment of the invention.

The embodiment of the invention will be described illustratively in more details hereinafter with reference to FIG. 3 and FIG. 4. FIG. 3 depicts a flow chart of an example of the search-based word segmentation method according to the embodiment of the invention. As illustrated in FIG. 3, firstly in step S1101, a document S is input, e.g. a Chinese document. After that, in step S1102, the given document S is segmented by punctuation into sentence units, thus giving $\{s_i\}$ illustrated in FIG. 3, where i indicates the $i^{th}$ item in $\{s_i\}$. In the inventive method, respective items are processed until all the items in $\{s_i\}$ are processed. In step S1103, each of the segmented sentence units, i.e. each $s_i \in \{s_i\}$, is submitted to a search engine, which typically provides various word segmentation units. Next in step S1104, a set of all word segmentation units $\{w^i_j\}$, returned from all search engines, are collected based upon the search results, where i is the $i^{th}$ item in $\{S_i\}$, j is an index of a word segmentation unit. If one uses a public search engine like Yahoo!, Google, etc., he can extract a candidate word segmentation unit from HTML source files of returned search results, that is, extract a highlighted phrase in returned snippets, such as a red one illustrated in FIG. 4, which illustrates search results of the public Yahoo! search engine for "他高兴地说" ("he said happily"). However, if a self-maintained search engine is available, information directly provided from an indexing table can be used to view adjacencies of positions of terms in a document to obtain a word segmentation unit. It shall be appreciated that the invention will not be limited to this, but it is also possible to collect all highlighted phrases given in search results from a public or self-maintained search engine, and to combine the search results. Indeed, the collection of candidate word segmentation units based upon multiple search engines provided with different local segmentation models will yield a better segmentation performance, because a feature (e.g. frequency) is calculated based upon top-ranked documents, and local segmentation models affect the search results and hence the candidate word segmentation units.

The embodiment of the invention will be further detailed to make the invention described more clearly. A typical operation process of a search engine is as follows. The search engine preliminarily segmented a submitted query into a set of terms based upon the query. These terms are either n-grams or are based upon a local segmentation model as adopted by this search engine. Then the search engine indexes all documents that contain one or more of these terms (i.e. hits), calculates a score for each document based upon the hits, ranks the documents, and finally outputs the top ranked documents (e.g. first 1,000 ones) to the user. In general, in accordance with the ranking strategy, the more hits a document contains, the higher this document ranks.

Thus, the hits contained in the top-ranked documents intuitively suggest some candidate word segmentation units, which units indicate how characters associate with each other in a natural language. As shown in FIG. 4, for instance, "他高兴地" ("he happily), "高兴" ("happy"), "他说" ("he said"), etc. are obtained for a sentence such as "他高兴地说" ("he said happily"). Moreover, a distribution (e.g. frequency) of a term indicates popularity of the term, or how probably certain characters will associate with each other. Still referring to FIG. 4, as can be seen, "他高兴地" appears three times, and "高兴" appears four times. If a frequency in which a term appears is used as a criterion for evaluation of a candidate word segmentation unit, then "高兴" ("happy") will be preferred to "他高兴地" ("he happily") as the former has a higher frequency than that of the latter. On the other hand, an n-gram or a local segmentation model as adopted by the search engine may not be effective per se. In the inventive method, the collected candidate word segmentation units are highlighted phrases in snippets of retrieved documents. Because Web documents are human-written, thus they follow the natural language. Even if the local segmentation of a search engine is not correct, the local segmentation will be corrected by those documents, or by the way people speak. Taking an extreme case as an example, it can be assumed that a search engine separates each character, i.e. neither local segmentation model nor n-gram is adopted, and the search engine uses each unigram (i.e. each term contains only one character) as a term to index the documents. In this case, these terms will be in neighbor of each other in the retrieved documents. FIG. 4 illustrates an example of Yahoo! search results for 他高兴地说" (he said happily). Red highlights indicate word segmentation units, e.g. "他高兴地" (he happily), "说" (say), "高兴" (happy), etc.). It appears that "他高兴地" is identified as a n-gram by the search engine. However, it can be seen by viewing a source file of an HTML file that this search engine indexes only each part of this n-gram. Here, the source file is like this: <b>他</b><b>高兴</b><b>地</b>. Phrases quoted in <b></b> gives a preliminary segmentation by the search engine. As can be seen from this example, the candidate word segmentation units will not be affected by the local segmentation model of a search engine.

Next, invalid word segmentation units can be preferably filtered out from $\{w^i_j\}$. There are two types of invalid word segmentation units. One is a word segmentation unit that does not appear in a query sentence, i.e. the query sentence does not contain a part of a character sequence that exactly matches this word segmentation unit. Another is the so-called unigram, strictly speaking, such segmentation cannot be deemed as a word segmentation method and most of such one-character terms are stopwords.

Next, the rest of candidate word segmentation units, which remain after the filtering out, are scored for reconstruction of the query sentence, and a word segmentation unit that most probably gives the query sentence corresponds to an optimal word segmentation.

In step S1105, all collected candidate word segmentation units are scored, and various available scoring methods can be used for this step. Hereinafter, two scoring method will be described illustratively, namely a frequency-based method and an SVM (Support Vector Machine)-based method.

In the present embodiment, the frequency-based method is used as a scoring method. A simplest way is to use, based upon the search results, occurrence frequencies of all terms in each $w^i_j$ as scores. The occurrence frequencies of all terms are defined as Eq. (1) below:

$$S_{tf}(w^i_j) = \frac{\sum_{k=1}^{N^i} TF_k(w^i_j)}{\sum_{k=1}^{N^i} \sum_{j} TF_k(w^i_j)} \quad (1)$$

Here, $S_{tf}(w^i_j)$ indicates a term frequency score of $w^i_j$, $N^i$ gives the number of documents retrieved by $s_i$, and $TF_k(w^i_j)$ is the number of times that $w^i_j$ appears in snippets of the $k^{th}$ document in the case that a public search engine is used.

The Eq. (1) gives the ratio of the number of occurrences of $w^i_j$ to the total number of occurrences of all the segmentation units $\{w^i_j\}$ corresponding to the query $s_i$. Fundamentally, this method corresponds to the maximum likelihood criterion. As to statistical learning theories, this criterion minimizes an empirical risk on a dataset when the dataset is large enough (in compliance with the large-number theory). The use of the maximum likelihood method as a nonlinear fitting method in the embodiment may be advantageous in that parameters estimated in this method will maximize a positive logarithmic likelihood value or minimize a negative logarithmic likelihood value.

As for the other scoring method, i.e. the SVM-based method, when a dataset is not large enough, it is considered to resort to minimize a structural risk, while the SVM-based method is such an algorithm that tries to minimize the structural risk on a dataset. Different kernels may be tried, such as RBF kernel, sigmoid kernel, linear and polynomial kernels. It is possible to choose either an SVM classifier or an SVM regression model to score a word segmentation unit. However, since the training of an SVM regression model requires providing a numerical score to each training data point, it is generally difficult to specify a score strategy. A much easier way is to leverage SVM classifiers as scoring models and, to map an output into a probability using a sigmoid function such as proposed by Platt, J., in Probabilistic outputs for support vector machines and comparisons to regularized likelihood methods. Large Margin Classifiers, Smola, A., Bartlett, P., Scholkopf, B., Schuurmans, D. (eds.), MIT Press, 1999. In the embodiment of the present invention, SVM classifiers are used to score each word segmentation unit.

To train an SVM classifier, each data point (i.e. candidate word segmentation unit) shall be firstly represented as a feature vector. For instance, one or a combination of the following three types of features can be extracted for each word segmentation unit:

1. LEN: The "LEN" feature is defined as the number of characters in a word segmentation unit. A longer word segmentation unit is preferred to a short one, because the former indicates a better semantic unit in applications of speech synthesis, speech recognition, and etc.

2. AVGOCCU: The "AVGOCCU" feature is defined as an average occurrence rate, that is, the number of times that a word segmentation unit appears, preferably in a set of "valid" word segmentation units (i.e., those which remain in the set of word segmentation units after invalid word segment units are filtered out), divided by the number of documents returned by the search engine. A higher AVGOCCU value indicates a better word segmentation unit.

3. DF: The "DF" feature is defined as a document frequency, that is, as for a word segmentation unit, how many search results contain the word segmentation unit. The larger the DF, the better the word segmentation unit.

In the SVM-based method, one or more features also can be used as the feature(s) of a word segmentation unit.

Next in step S1106, an optimal subset of candidate word segmentation units is determined from the candidate word segmentation units in accordance with the scoring results obtained in the step S1105. Various methods can be utilized in an embodiment of the invention to determine an optimal subset of candidate word segmentation units. Illustratively, in the present embodiment, the highest-ranked path can be found through terms of a reconstructed query sentence.

An illustrative path-finding method is dynamical programming. Here, there is an implicit constraint, that is, $w_i \equiv s_i$, the final path constructed by the subset of candidate word segmentation units should be identical to the query sentence. This constraints facilitates the generation of $w_i = w^i_1 w^i_2 \ldots w^i_n$ by limiting the selection of $w^i_{j+1}$ with given $w^i_j$. Obviously, the beginning character of $w^i_{j+1}$ should be the one which immediately follows the ending character of $w^i_j$ in a character string $S_i$.

An example of the ranking function is given in Eq. (2) below, which defines the optimal subset w* of word segmentation units as a subset of word segmentation units that gives a sequence with the highest path score:

$$w^* = \underset{w_i}{\operatorname{argmax}} S(w_i) = \underset{w_i}{\operatorname{argmax}} \frac{1}{n} \sum_{j=1}^{n} S(w_j^i) \qquad (2)$$

Here, S(•) is a score given via either the frequency-based method or the SVM-based method, and n is the number of word segmentation units contained in the optimal subset.

There will be other possible path-finding criteria which are effective, such as greedy search, etc.

Finally in step S1107, the optimal subset of word segmentation units is output as the way by which the query sentence is segmented.

The features and advantages of the invention have been demonstrated fully as above, and hereinafter, two apparent advantages of the inventing will be further described by way of the following examples.

Figure 5:
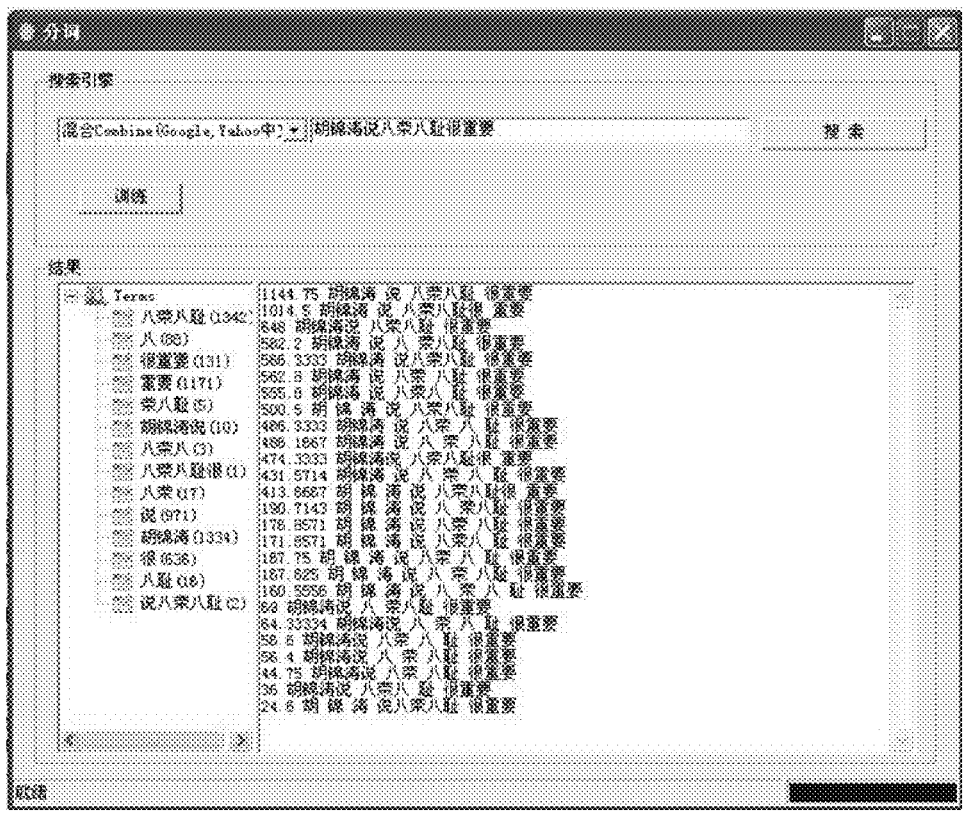
FIG. 5 depicts one illustrative word segmentation result according to the invention.

1) Since the previous methods require a support for dictionaries, the dictionaries is limited regardless of whether they are used for a real-time query (e.g. a dictionary-based method) or for training a word segmentation model (e.g. a statistical method, etc.). In contrast, the "dictionary" in the invention is dynamic and updatable in a real-time way. Therefore, identification of a new word is very simple and effective, so that the OOV problem can be avoided, which is inevitable in the previous methods. FIG. 5 illustrates word segmentation results of the inventive method for "胡锦涛说八、荣八耻很重要" vs. the IBM Full-Parser (a current dictionary-based word segmentation tool used by IBM). "八荣八耻" is a new word, and does not exist in dictionaries of the IBM Full-Parser due to limitations of the dictionary-based method. Therefore, the IBM Full-Parser segments "八荣八耻" into four independent word units "八", "荣", "八" and "耻". However, the new word "八荣八耻" can be identified correctly by the inventive method since the latter uses a set of documents, e.g. the Internet, and thus can be dynamic and updated in a real-time way.

Figure 6:
FIG. 6 depicts another illustrative word segmentation result according to the invention.

2) Since numerous documents retrieved though a search engine from the Internet are used to obtain initial word segmentation units, and the documents are human-written, and hence in compliance with a natural language, the inventive method can obtain directly a correct word segmentation result without a natural language analysis of the documents, by contrast with the previous methods. FIG. 6 gives an example for this, and illustrates word segmentation results of the inventive method for an illustrative sentence "有职称的和尚未有职称的 (those have titles of a technical post and these haven't titles of a technical post)" vs. the IBM Full-Parser. In this example, "和尚未有" involves different meanings, possibly segmented in the way of either "和尚(monk)" and "未有(haven't)" or "和(and)", "尚未(not yet)" and "有(have)". However, the illustrative sentence gives the context information "有职称的(have titles of a technical post)", and a "和(titles of a technical post)" is meaningless to "和尚". Therefore, the context information actually defines that a correct word segmentation approach should be the latter one, "和","尚未" and "有". As can be seen from FIG. 6, this has been embodied in the inventive method. Since the IBM Full-Parser uses a maximum matching method based upon dictionaries, and "和尚" exists in the dictionaries, and therefore gives the former word segmentation approach which is incorrect.

Of course, it shall be appreciated by those skilled in the art, the inventive method may be encoded as a program, which may be stored on a computer readable storage medium and executed by a computer to implement the inventive method. Therefore, a product of a computer program encoded according to the inventive method, and a computer readable storage medium, which stores the computer program, shall be encompassed by the invention.

It shall be noted that descriptions of some technical details, which are well known to those skilled in the art, and may be necessary to practice the invention, have been omitted to make the invention more apparent.

The specification is provided for the purpose of illustration and description but not to exhaust or limit the invention to the disclosure. Various modifications and variations shall be apparent to those skilled in the art.

For instance, various languages without a word boundary can be processed, various methods for inputting a query can be used, one or more search engines can be utilized, static or dynamic weighting can be performed on search results obtained from different search engines, any other scoring method for candidate word segmentation units can be used, any other ranking method for subsets of candidate word segmentation units can be used, etc.

Accordingly, the embodiments have been selected and described to explain better the principle and practical applications of the invention, and it shall be appreciated by those skilled in the art that all modifications and changes without departing the spirit of the invention shall fall into the scope of the invention as defined by the claims.

What is claimed is:

1. A search-based word segmentation method for a language without a word boundary tag, comprising the steps of:
   a. providing at least one search engine with a segment of a text comprising at least one segment;
   b. searching for the segment through the at least one search engine, and returning search results each including candidate word segmentation units; and
   c. determining a word segmentation approach for the segment in accordance with at least part of the returned search results by performing steps of:
   extracting, from the at least part of the returned search results, all candidate word segmentation units appearing in the segment;
   scoring the extracted candidate word segmentation units;
   ranking subsets of extracted candidate word segmentation units in accordance with the scoring, wherein the candidate word segmentation units in each subset sequentially form the segment; and
   selecting a highest-ranked subset as the word segmentation approach for the segment.

2. The method according to claim 1, wherein the at least part of the returned search results are top-ranked search results.

3. The method according to claim 1, wherein the step c further comprises the step of filtering out, from the extracted candidate word segmentation units, an invalid candidate word segmentation unit, which is one of a unigram or a word segmentation unit that does not appear in the segment.

4. The method according to claim 1, wherein the method for scoring the candidate word segmentation units is frequency-based, and for the part of the search results, a ratio of the number of occurrences of the scored candidate word segmentation units to the total number of occurrences of all the candidate segmentation units is taken as the score for each of the scored candidate word segmentation units.

5. The method according to claim 1, wherein the method for scoring the candidate word segmentation units is SVM (Support Vector Machine)-based, using an SVM classifier or an SVM regression model to score each candidate word segmentation unit; and representing the candidate word segmentation units, which are data points, as feature vectors so as to train the SVM classifier and the SVM regression model.

6. The method according to claim 5, wherein a feature extracted for each candidate word segmentation unit comprises one or a combination of the following features:
   a number of characters in the candidate word segmentation unit;
   an average occurrence rate, which is a number of times that the candidate word segmentation unit appears, divided by a number of documents in the search results returned by the search engine; and
   a document frequency, which is a number of search results containing the candidate word segmentation unit.

7. The method according to claim 4, wherein a subset of candidate word segmentation units with a highest average score of candidate word segmentation units is selected as the word segmentation approach for the segment.

8. The method according to claim 1, wherein the extracting of candidate word segmentation units from the returned search results is implemented via extracting highlighted phrases in returned snippets.

9. The method according to claim 1, wherein, when the search engine is a self-maintained search engine, a word segmentation unit is obtained by viewing adjacencies of positions of terms in a document using information provided from an indexing table.

10. A search-based word segmentation device for a language without a word boundary tag, comprising:
   at least one search engine, adapted to receive a segment of a text comprising at least one segment, to search in a search network for the segment, and to return search results each including candidate word segmentation units; and
   a word segmentation result generating means, adapted to select a word segmentation approach for the segment in accordance with at least part of the returned search results by extracting, from the at least part of the returned search results, all candidate word segmentation units appearing in the segment; scoring the extracted candidate word segmentation units;
   ranking subsets of extracted candidate word segmentation units in accordance with the scoring, wherein the candidate word segmentation units in each subset sequentially form the segment; and selecting a highest-ranked subset as the word segmentation approach for the segment.

11. The device according to claim 10, wherein the at least part of the search results returned by the at least one search engine are top-ranked search results.

12. The device according to claim 10, wherein the word segmentation result generating means is further adapted to filter out, from the extracted candidate word segmentation units, an invalid candidate word segmentation unit, which is one of a unigram or a word segmentation unit that does not appear in the segment.

13. The device according to claim 10, wherein the word segmentation result generating means scores the candidate word segmentation units in a frequency-based manner, and the word segmentation result generating means is further adapted to: for the part of the search results, take a ratio of the number of occurrences of the scored candidate word segmentation units to the total number of occurrences of all the candidate segmentation units as the score for each of the scored candidate word segmentation units.

14. The device according to claim 10, wherein the word segmentation result generating means scores the candidate word segmentation units in a SVM (Support Vector Machine)-based manner, uses an SVM classifier or an SVM regression model to score each candidate word segmentation unit, and represents the candidate word segmentation units, which are data points, as feature vectors so as to train the SVM classifier and the SVM regression model.

15. The device according to claim 14, wherein a feature extracted for each candidate word segmentation unit comprises one or a combination of the following features:
   a number of characters in the candidate word segmentation unit;
   an average occurrence rate, which is a number of times that the candidate word segmentation unit appears, divided by a number of documents in the search results returned by the search engine; and
   a document frequency, which is a number of search results containing the candidate word segmentation unit.

16. The device according to claim 13, wherein the word segmentation result generating means is further adapted to select a subset of candidate word segmentation units with a highest average score of candidate word segmentation units as the word segmentation approach for the segment.

17. The device according to claim 10, wherein the word segmentation result generating means extracts candidate word segmentation units from the returned search results by extracting highlighted phrases in returned snippets.

18. The device according to claim 10, wherein, when the search engine is a self-maintained search engine, the word segmentation result generating means is adapted to use information provided from an indexing table to view adjacencies of positions of terms in a document to obtain a word segmentation unit.

19. A computer program product stored on a non-transitory computer readable storage medium and executed by a computer to perform a search-based word segmentation method for a language without a word boundary tag, wherein said method comprises the steps of:
   a. providing at least one search engine with a segment of a text comprising at least one segment;
   b. searching for the segment through the at least one search engine, and returning search results each including candidate word segmentation units; and
   c. determining a word segmentation approach for the segment in accordance with at least part of the returned search results by extracting, from the at least part of the returned search results, all candidate word segmentation units appearing in the segment; scoring the extracted candidate word segmentation units;
   ranking subsets of extracted candidate word segmentation units in accordance with the scoring, wherein the candidate word segmentation units in each subset sequentially form the segment; and selecting a highest-ranked subset as the word segmentation approach for the segment.

* * * * *